Patented Apr. 5, 1949

2,466,487

UNITED STATES PATENT OFFICE 2,466,487

PROCESS OF OBTAINING INSULIN FROM PANCREAS GLANDS

David Alymer Scott, Forest Hill, and Albert Madden Fisher, Toronto, Ontario, Canada, assignors to The Governors of The University of Toronto, Toronto, Ontario, Canada No Drawing. Application July 24, 1946, Serial No. 685,924

6 Claims. (Cl. 167—75)

Our invention relates to a process of obtaining Insulin from pancreas glands.

In the commonly used processes of obtaining Insulin from pancreas, the initial extraction of the pancreas glands, usually minced or ground, has been by using an organic solvent of the type of ethyl alcohol, methyl alcohol, and acetone in concentrations in which the organic solvent is the major part of the liquid involved, with that liquid containing a relatively low concentration of acid, not over 2% by weight. For instance, when alcohol is used, the customary alcohol concentration before mixing with the glands is of the order of 65% to 95% by volume, (usually about 95% for the first extraction and about 65% for any subsequent extraction), which makes an alcohol concentration after mixing with the glands of the order of 60% to 70% by volume. The extraction involves mixing the extracting liquid with the pancreas glands, and the subsequent separation from the pancreas residue (as by filtering) of the extracting liquid containing the extracted Insulin and other substances.

We have discovered that we can get as high or higher yields of Insulin, with a simplification of procedure, if instead of an extracting liquid of which an organic solvent constitutes considerably over half, and which contains relatively little acid, we use a lower fatty acid in at least fairly high concentration, in an essentially aqueous diluent if a diluent is used. Most desirably we use acetic acid in water. By "lower fatty acid" we mean formic acid, acetic acid, propionic acid, and butyric acid, and any mixture of them. Although any diluent of the lower fatty acid is desirably water, one or more organic solvents, such as ethyl or methyl alcohol or acetone or a loweralkyl chloride, may be co-present, in an amount not exceeding 25% of the whole.

As the extracting liquid that is mixed with the minced or ground pancreas glands, we prefer to use water containing at least 15 grams and desirably between 20 and 30 grams of the lower fatty acid per 100 grams of extracting liquid. The desired concentration of acid may be obtained by mixing the acid and water prior to putting either on the pancreas glands; or may be obtained by mixing on the pancreas glands, with either the water or the fatty acid mixed with the glands first.

If desired, more than one extraction of the pancreas glands may be made, with or without varying the extracting liquid. Accordingly, an extraction according to our process may be either preceded or followed by other Insulin extractions of the pancreas glands, with the same general character of extracting liquid or with extracting liquids of other character, such for instance as water or as the low-acid alcohol or acetone used in previous processes.

The fatty-acid extract containing Insulin, thus obtained from the pancreas glands, may be treated in any of a number of ways to obtain the Insulin in suitable form for administration. These subsequent treatments are not part of the present invention, and may be varied within the knowledge of those skilled in the art; for the present application is directed to the step of obtaining this fatty-acid extract from the pancreas glands.

The following are examples of our process:

*Example 1.*—To 4 kilograms of minced pancreas glands, as from beef, calf, hog, horse, or sheep, we add 8 liters of aqueous acetic acid, of an acid concentration of about 25% by weight, and the whole is appropriately mixed. The pancreas residue remaining as solid matter is suitably removed, as by filtration, to obtain an Insulin-containing filtrate. Any desired expedients may be used to facilitate filtration; as, for instance, by adding sodium chloride at a convenient stage, say to about 1% or 2% concentration by weight, or by heating to a temperature between 56° and 80° C., conveniently about 70° C., or desirably both.

The filtrate thus obtained is a crude extract of Insulin, and contains much of the Insulin of the extracted pancreas glands. When injected into animals, in suitable concentrations, it produces typical Insulin effects. This crude extract of Insulin may be used in place of the customary acid-alcohol extract as a source for obtaining purified preparations of Insulin for human administration.

If desired, the pancreas residue may be subjected to one or more further extractions, conveniently with water or an aqueous acetic acid of the same or different (higher or lower) concentration. The filtrates from subsequent extractions can be treated or used separately, or combined with the filtrate from the first extraction.

The combined crude extract, or any of the separate crude extracts, may be suitably purified and concentrated in any of the ways known to those skilled in the art.

*Example 2.*—Example 1 may be repeated, save that the concentration of acetic acid is different. We can use concentrations as low as 15 grams of acetic acid per 100 grams of the aqueous acetic acid that is to be mixed with the pancreas glands; and as high as glacial acetic acid for fair results, although for best results and greater convenience in handling we prefer not to exceed 30 g. of actic acid per 100 g. of the aqueous acetic acid.

With any concentration of acetic acid, or of any other fatty acid contemplated by our invention, the aqueous liquid that is added to the glands should contain at least 15 grams of the fatty acid per 100 grams of the liquid so added to the glands; and in any case there should be used at least 15 grams of the fatty acid per 100 grams of the pancreas, and the extracting liquid should have a weight between 50% and 500% of that of the glands.

*Example 3.*—Either of Examples 1 or 2 may be repeated, using other lower fatty acids—that is, using formic acid or propionic acid or butyric acid.

*Example 4.*—Any of Examples 1 to 3 may be repeated, using the fatty acid in water containing a low concentration, of not over 25%, of ethyl alcohol or methyl alcohol or acetone.

*Example 5.*—Any of Examples 1 to 4 may be repeated, but using a pancreas residue from other extractions as the source of Insulin instead of using previously unextracted pancreas glands; as, for instance, the pancreas residue from a previous extraction by the hitherto customary acid-alcohol methods.

We claim as our invention:

1. In the process of obtaining Insulin preparations from pancreas glands, the steps of extracting pancreas glands with an aqueous liquid which contains between 15 and 30 grams of a lower fatty acid per 100 grams of the liquid and in which any co-present organic solvent of the class consisting of lower aliphatic monohydroxy alcohols and acetone is in an amount not exceeding 25% by volume, separating the insulin-containing extract from the pancreas residue, and recovering insulin from that extract.

2. In the process of obtaining Insulin preparations from pancreas glands, the steps of extracting pancreas glands with an aqueous liquid which contains between 15 and 30 g. of a lower fatty acid per 100 g. of the liquid and which contains at least 15 grams of that lower fatty acid per 100 grams of pancreas, and in which any co-present organic solvent of the class consisting of lower aliphatic monohydroxy alcohols and acetone is in an amount not exceeding 25% by volume, and the extracting liquid has a weight between 50% and 500% of that of the glands, separating the insulin-containing extract from the pancreas residue, and recovering insulin from that extract.

3. The process as set forth in claim 1, in which the lower fatty acid is acetic acid.

4. The process as set forth in claim 2, in which the lower fatty acid is acetic acid.

5. In the process of obtaining Insulin preparations from pancreas glands, the steps of extracting pancreas glands with an aqueous solution of a lower fatty acid containing between 15% and 30% by weight of the fatty acid, separating the insulin-containing extract from the pancreas residue, and recovering insulin from that extract.

6. In the process of obtaining Insulin preparations from pancreas glands, the steps of extracting pancreas glands with an aqueous solution of acetic acid containing between 15% and 30% by weight of acetic acid, separating the insulin-containing extract from the pancreas residue, and recovering insulin from that extract.

DAVID ALYMER SCOTT.
ALBERT MADDEN FISHER.

REFERENCES CITED

The following references are of record in the file of this patent:

UNITED STATES PATENTS

| Number | Name | Date |
|---|---|---|
| 1,469,994 | Banting et al. | Oct. 9, 1923 |
| 1,646,553 | Murlin | Oct. 25, 1927 |
| 2,050,558 | Bockmuhl et al. | Aug. 11, 1936 |
| 2,219,167 | Schultz | Oct. 22, 1940 |

OTHER REFERENCES

Best et al.—J. Biol. Chem. vol. 57 (1923), pages 715–717, 720, 721.

Somogyi et al.—J. Biol. Chem. vol. 60 (1924), pages 40–44. Copy in P. O. S. L. QP 501J7.